United States Patent [19]

Vigil et al.

[11] 3,840,859

[45] Oct. 8, 1974

[54] METHOD AND APPARATUS FOR REGULATING INPUT/OUTPUT TRAFFIC OF A DATA PROCESSING SYSTEM

[75] Inventors: Jacob F. Vigil, Monrovia; John Brenton Wise, III, Monterey Park, both of Calif.

[73] Assignee: Burroughs Corporation, Detroit, Mich.

[22] Filed: July 3, 1972

[21] Appl. No.: 268,645

[52] U.S. Cl. .... 340/172.5
[51] Int. Cl. .... G06f 3/00
[58] Field of Search .... 340/172.5

[56] References Cited

UNITED STATES PATENTS

| | | | |
|---|---|---|---|
| 3,370,276 | 2/1968 | Schell, Jr. | 340/172.5 |
| 3,413,612 | 11/1968 | Brooks et al. | 340/172.5 |
| 3,568,165 | 3/1971 | Kerr | 340/172.5 |
| 3,593,300 | 7/1971 | Driscoll, Jr. et al. | 340/172.5 |
| 3,618,039 | 11/1971 | Baltzly et al. | 340/172.5 |
| 3,623,021 | 11/1971 | Haskin et al. | 340/172.5 |

*Primary Examiner*—Gareth D. Shaw
*Assistant Examiner*—Melvin B. Chapnick
*Attorney, Agent, or Firm*—Albin H. Gess; Edward G. Fiorito

[57] ABSTRACT

In a modular data processing system, the input/output control unit is regulated as to the number of concurrent I/O operations it may accept, to prevent the occurrence of excessive access errors, and to help distribute the system I/O operations among all the input/output control units, when there are more than one. A continual comparison is made between a threshold variable, which defines an I/O control unit's instantaneous bandpass, and a traffic variable, the traffic variable being derived from the number and types of concurrent I/O operations proceeding on a certain input/output control unit at a given instant. When the traffic variable equals or exceeds the threshold variable for that unit, that input/output control unit is directed not to accept any more I/O operations. By appropriately adjusting the threshold variable for each input/output control unit for a plurality of I/O control units in a data processing system, the I/O operations of the entire system can be optimumly allocated among the input/output control units of the system.

5 Claims, 3 Drawing Figures

METHOD AND APPARATUS FOR REGULATING INPUT/OUTPUT TRAFFIC OF A DATA PROCESSING SYSTEM

BACKGROUND OF THE INVENTION

The present invention relates to the input/output operations of a data processing system and more particularly pertains to the regulation of the number of concurrent input/output operations being performed by the input/output apparatus of the data processing system at a particular instant in time.

In present day data processing systems comprising data processor modules, memory modules and input-/output control units, the input/output units or modules will respond with a path-is-available signal when an I/O path is requested by a processor module, if one or more of the following conditions, for example, exist in the input/output units: the I/O unit is not initiating another peripheral control operation, the I/O unit has a path existing between itself and the peripheral for which access was requested by the processor, and the I/O unit is not servicing all its I/O channels. These three example criteria for accepting additional I/O operations as well as other criteria that are used do not take into consideration the fact that the data transfer rate of this operation when added to the data transfer rates of the already proceeding I/O operations may lead to a total data transfer or traffic rate which exceeds the inherent data transfer rate bandpass of the I/O control unit, resulting in an increase of access errors.

The occurrence of an access error, which will be hereinafter defined, during a particular I/O operation results in the entire operation having to be reinitiated. Thus, if the access errors increase, less and less I/O operations are being completed and more and more reinitiations of I/O operations are occurring. If this were to continue to a critical point, the I/O unit would become completely bogged down to the point where it could no longer accomplish any I/O operations. The above-described situation applies to each and every input/output unit of a modular data processing system.

Modular data processing systems have their I/O units connected to the peripherals with which the system communicates in a manner that will permit a particular peripheral to communicate with the system through more than one input/output unit. Because of this arrangement, a problem arises in efficiently allocating an I/O operation on a particular peripheral to a particular I/O control unit. To allow the greatest system throughput, the I/O traffic of the system should be allocated among the I/O units according to their busyness, the least busy I/O unit receiveing the next I/O operation. This is usually not the case, however. Generally the I/O control units are requested to initiate a data transfer operation in a sequential fashion, I/O unit one first, I/O unit two second, if I/O unit one is not accepting further I/O operations, etc. This procedure may result in I/O unit one being the busiest while all the other units vary in their degree of busyness. While the plurality of I/O units operating together to interface a plurality of peripheral units with the data processing sysem may, as a whole, be capable of handling a large percentage of their I/O operations concurrently, because of the possibility of the phenomena of differing order of busyness occurring, access errors can be experienced at a system level considerably before the data transfer rate bandpass of the system is reached.

Heretofore, data processing systems have ignored these problems and put up with increased access erros, or have attempted to prevent the occurrence of the problem by excessively restricting the number of peripheral units connected to the data processing system.

SUMMARY OF THE INVENTION

It is therefore an object of this invention to prevent the occurrence of excessive access errors due to the number of concurrent I/O operations being performed by one input/output control unit.

Another object of this invention is to provide a means for efficiently allocating all systems I/O operations between the several input/output control units of a processing system.

The foregoing objects and the general purpose of this invention are accomplished by continually comparing a threshold variable for a particular input/output control unit with a traffic variable which is derived from the number and types of concurrent I/O operations proceeding at that particular input/output control unit at a certain instant. The threshold variable which is an input/output control unit's instantaneous bandpass may vary according to the mix of peripherals operating on that input/output control unit. This bandpass may be varied dynamically in response to a change in the peripheral mix. The traffic variable is the total instantaneous I/O traffic rate for a particular input/output control unit. Upon the traffic variable equalling or exceeding the threshold variable for a particular input/output control unit, that particular input/output control unit is directed not to accept new I/O operations.

BRIEF DESCRIPTION OF THE DRAWINGS

Other objects and many of the attendant avantages of this invention will be readily appreciated as the same becomes better understood by reference to the following detailed description and considered in connection with the accompanying drawings in which like reference numerals designate like parts throughout the figures thereof, and where.

DESCRIPTION OF THE PREFERRED EMBODIMENT

To facilitate a better understanding of the invention, a brief theoretical discussion of our invention will be presented first.

In modern I/O subsystems peripherals ae serviced on demand; i.e., a request is made for a portion of an I/O record by the peripheral. The I/O central unit grants this request by sending or receiving this requested portion of the I/O record. The types of peripheral units used, such as disk and magnetic tape units, for example, must send or receive these portions of records in a certain fixed amount of time. If their request for service cannot be granted in this time, the information contained in that portion of the record is lost. This loss of information, is called an access error. In the case of disk peripheral units, the information is lost for one revolution of the disk. In the case of tape peripheral units, the information can only be retrieved by rewinding the tape and running it from the beginning again. On a tape peripheral unit, therefore, information is lost for an extended period of time.

It has been observed that as more and more bytes of data are being concurrently transferred between the processor and a plurality of peripheral units through an I/O control unit, the number of complete data transfers from a peripheral unit to the processor system or vice versa begins to drop, because reality an increase in access errors.

Figure 1:
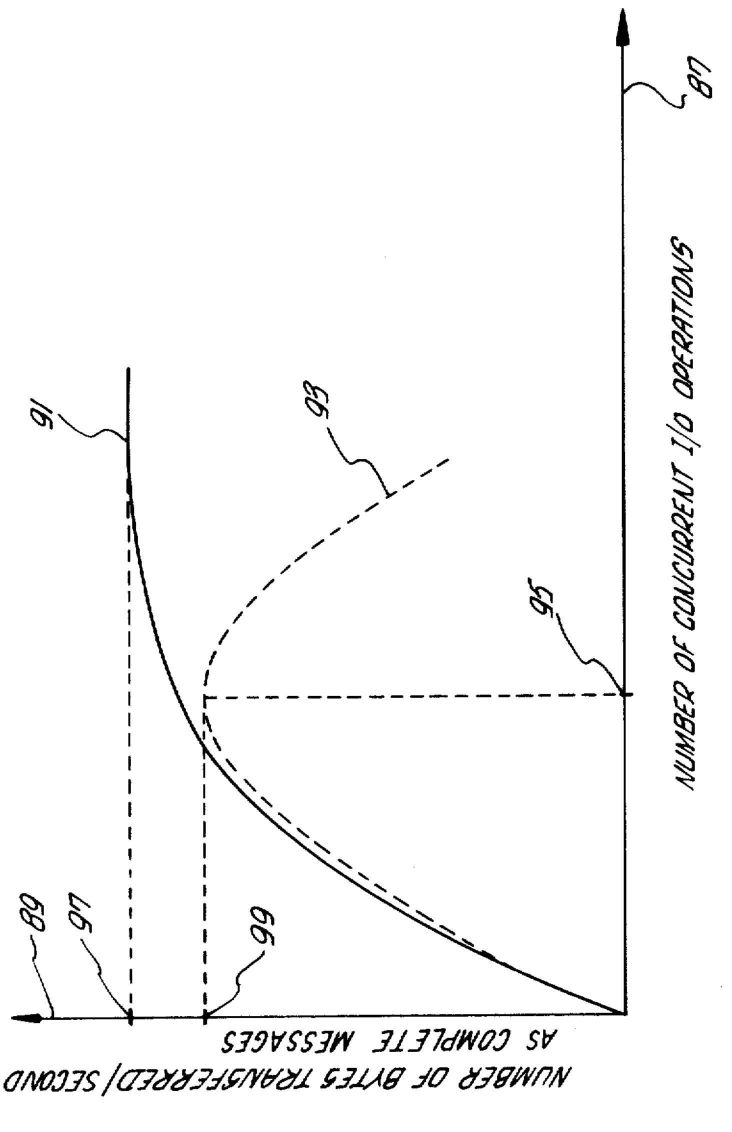
FIG. 1 is a graphical illustration of the data transfer rate phenomena occuring between the processor system and the peripherals.

This relationship is illustrated by the graph of FIG. 1 where the number of data bytes transferred through a single I/O control on the vertical axis 89 is plotted versus the number of concurrent I/O operations on the horizontal axis 87. It must be remembered that the curves are idealistic representations of readity and are presented only to illustrate the theoretical background for our invention.

Assuming that all the peripherals communicating with a data processing system through a single I/O control are identical units, the solid curve 91 illustrates that as the number of concurrent I/O operations increase, the number of data bytes transferred through the I/O control increases, sharply for a while, and then levels off. That is, as more and more peripheral units are thrown into simultaneous operation through the I/O control, the number of data bytes transferred through the I/O control reaches an upper limit 97 usually referred to as the I/O unit's absolute bandpass. The dashed line curve 93 illustrates the number of data bytes transferred as complete messages from the peripheral to the data processor, or vice versa, as the number of concurrent I/O operations increases.

As this curve illustrates, the number of complete groups of data bytes or I/O records transferred increases sharply as the number of concurrent I/O operations increases, for a while, and then, rather than leveling off, begins to drop. This result has been observed and is attributed to the inability of the peripheral units to send or receive an entire I/O record. Usually the portion of the I/O record transferred cannot be used and that peripheral must be interrogated again and a new operation initiated for it. The occurrence of only a fraction of a record being sent within a particular time frame is also called an access error. If the occurrence of access errors were projected to an extreme, eventually the data bytes being transferred through an I/O control will not comprise complete message units but will consist only of non-useable fractions of message units. The processor as a result of this would not be getting or transferring useful information and become bogged down with continually requesting the same I/O operations over and over again. This extreme result can be prevented and excessive access errors can be avoided by limiting the number of concurrent I/O operations that a particular I/O control will accept. The point at which an I/O control should not take on further I/O operations is shown in FIG. 1, point 95, which can be seen to represent the optimum point from the standpoint of the maximum number of full and completed concurrent message transfers. This optimum point does not represent the point of zero access errors. The number of data bytes transferred per second as complete messages or records 99 that is directly related to this point 95 is the I/O units' instantaneous bandpass.

The number of concurrent I/O operations can be translated into a traffic rate number which can be represented by a binary number. It should be remembered, however, that the curves of FIG. 1 are idealistic and assume the unlikely condition that the plurality of peripheral units that are to communicate with a data processing system are identical in their speed and characteristics. If a mix of peripherals, as is normally the case, is communicating with a data processing system, the curves 91, 93 of FIG. 1 would deviate somewhat from the ideals shown. However, the basic relationships between the two curves would hold true. In other words, the data bytes transferred would stabilize at an upper limit of a certain number of concurrent I/O operations whereas the actual number of data bytes transferred per second as complete messages would drop after a certain number of concurrent I/O operations. Whether this would occur sooner or later than at the point 95 shown on FIG. 1 would depend on the operating speed of the peripherals being switched into the data processing system. For slower peripheral units such as tape units, the ideal point of concurrent I/O operations would be to the right of point 95. For faster peripheral units the ideal number of concurrent I/O operations would be to the left of point 95. By knowing the basic relationships between the number of actual data bytes transferred as complete messages and the number of concurrent I/O operations as shown in FIG. 1, the optimal point, that is, the point at which the maximum number of concurrent I/O operations occur, for any configuration of peripheral units communicating with a data processing system can be determined by experimentation.

Figure 3:
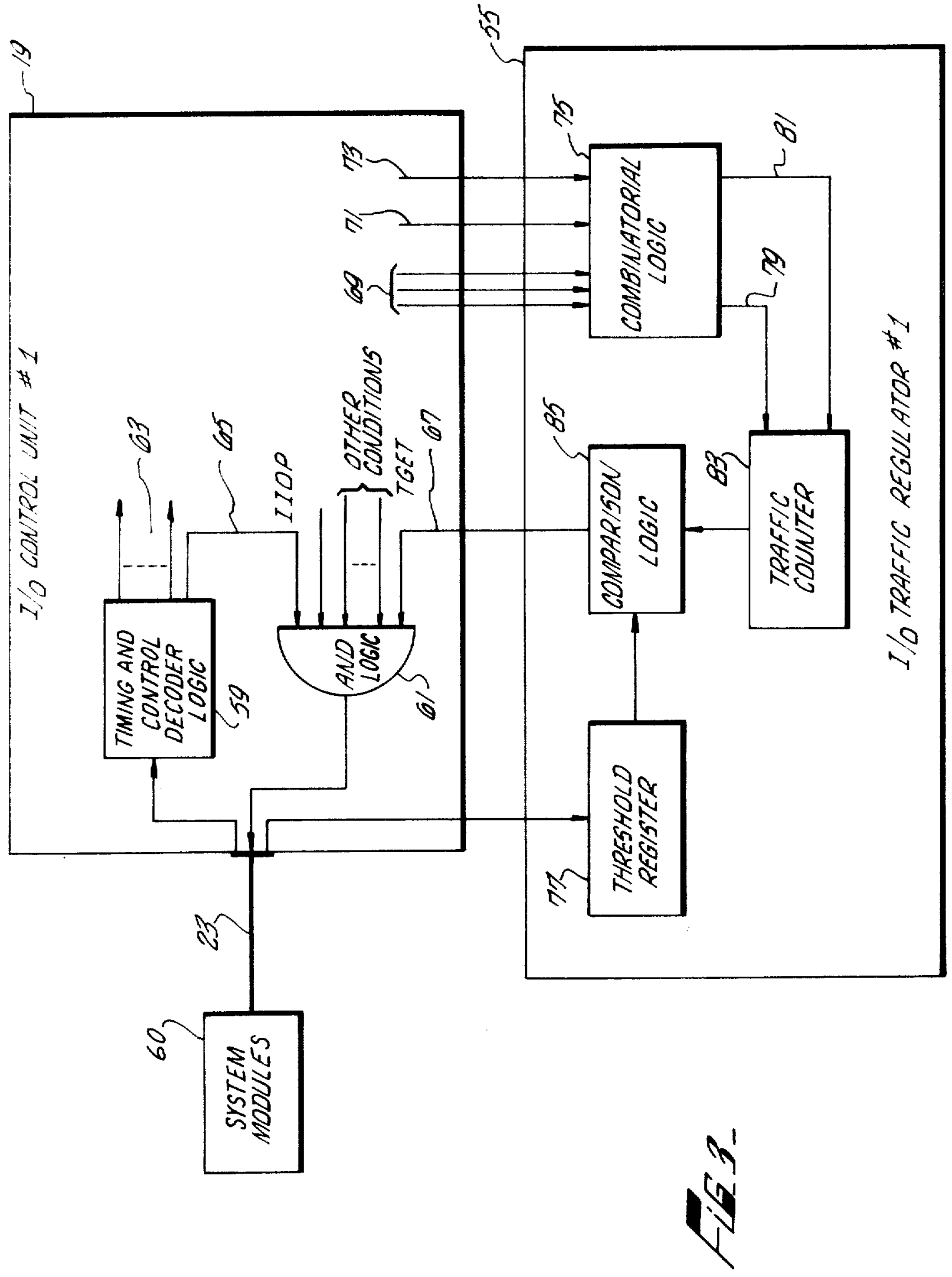
FIG. 3 is a block diagram illustration of the invention and its relationship with a single I/O control unit.

This is accomplished simply by increasing the number of concurrent I/O operations by throwing into operation various peripheral units of varying characteristics, until an unacceptable access error level is reached. At this point the number of concurrent I/O operations is known as well as the type of peripheral units operating on this particular input/output control. The data traffic rate at this point can be determined by giving each peripheral unit its weighted binary count and then summing these binary counts into a single binary number. This number then would represent the threshold factor above which the traffic count of a particular I/O control should not go. This threshold factor is loaded into a threshold register 77 (FIG. 3). The above-described traffic rate and threshold factor determination can be accomplished either manually or by software implementation, the software implementation being considered to be well within the purview of a person of ordinary skill in the art.

Figure 2:
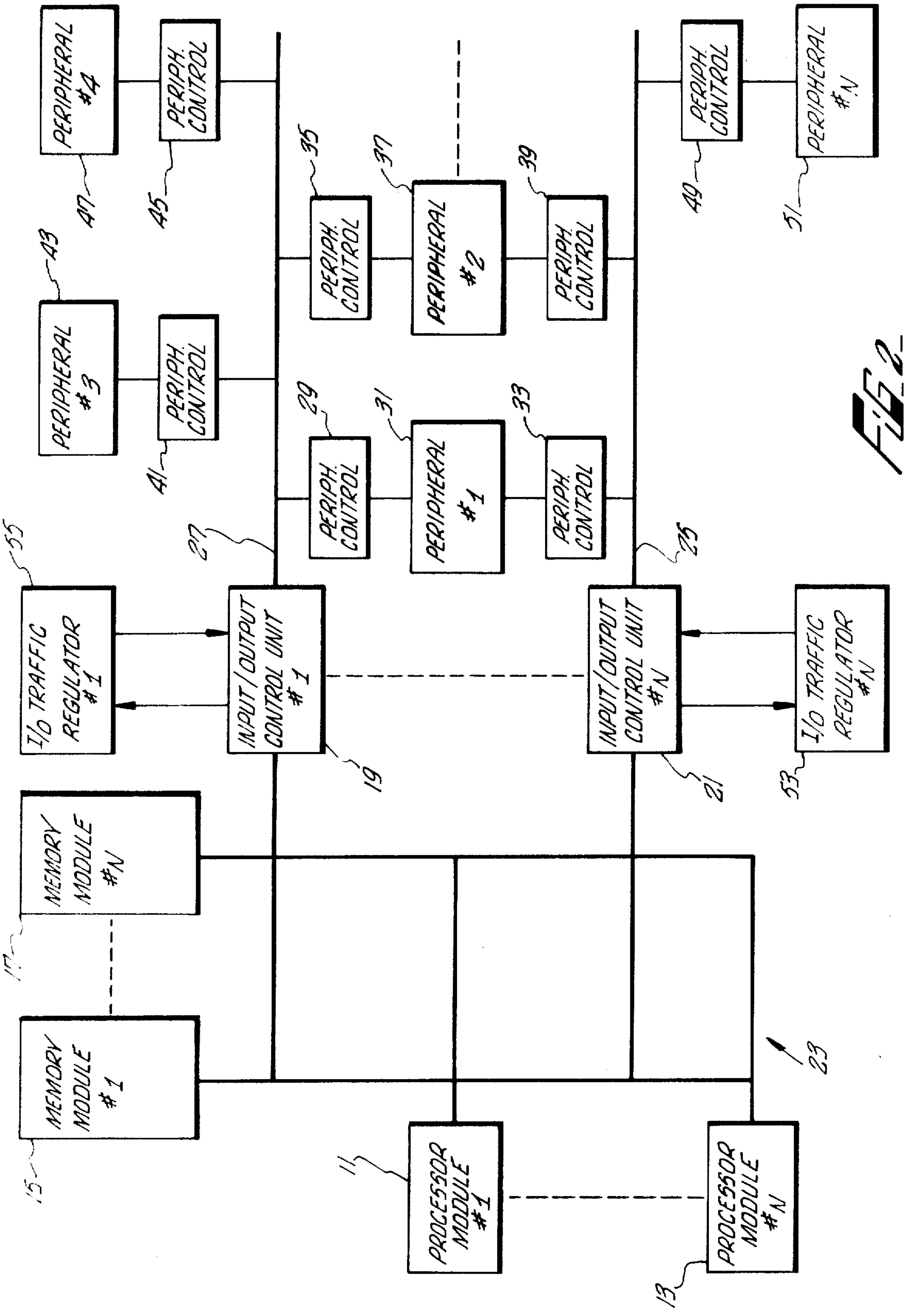
FIG. 2 is a block diagram illustration of a modular data processing system showing the inter-relationship of the invention with the system.

Referring now to FIG. 2, a modular multiprocessor data processing system is shown utilizing I/O traffic regulators 53, 55 which comprise our invention. Modular multiprocessor data processing systems that comprise a plurality of processor modules 11, 13, a plurality of memory modules 15, 17 and a plurality of input/output control units or modules 19, 21 interconnected by an exchange network 23 for cross-communication between each of the above-mentioned modules, are well known in the art. One example of such a modular data processing system is a patent to J. T. Lynch et al for Modular Multi-Computing Data Processing Systems (U.S. Pat. No. 3,411,139), said patent being assigned to the assignee of this invention. Another example can be found in a patent to D. N. McDonald et al for Data Processing System (U.S. Pat. No. 3,200,330) which is assigned to the assignee of this invention.

The modular data processor of FIG. 2 communicates with a plurality of peripheral devices by means of I/O buses 25 and 27 which are connected and have access to the data processing system through the input/output control units 19, 21. Any convenient number of peripheral devices 31, 37, 41, 45 and 51 may be connected to the data processing system by way of one or more of these I/O buses. For example, peripheral number 1, 31 which may be a disk file, a tape unit, a line printer, etc. is connected to both I/O buses 25, 27 by means of its control units 29, 33. This permits peripheral number 1 the ability of communicating with the data processing system through either of the I/O buses 25, 27 and either of the input/output control units 19, 21. The same situation holds true for peripheral number 2, 37 since it also has dual control circuits 35, 39. Peripheral number 3, 43 and peripheral number 4, 47 are connected only to one I/O bus 27 through their respective control units 41, 45. Peripheral number N, 51 is shown as connected only to one I/O bus 25 through its control unit 49.

This arrangement of peripheral devices and their communication with the data processing system by way of the I/O buses, is only illustrative. It should be remembered that the peripheral devices may be increased to any desirable and feasible number which also holds true for the input/output control units, the processor modules and the memory modules of the data processing system. Also, one peripheral may be connected so that it can communicate wth the data processor system by more than two paths. A more precise explanation of the structure and operation of a modular data processing system can be found in the above-mentioned patent to J. T. Lynch et al.

To optimize the traffic flow of the data processing system, an I/O traffic regulator which comprises our invention is connected to each input/output control unit or multiplexor of the system. An example of such an input/output control unit, called a "peripheral control multiplexer," can be found in a patent to E. A. Hauck for "Input/Output Control for a Digital Computing System" (U.S. Pat. NO. 3,408,632) which is assigned to the assignee of this invention. The disclosure of that patent is completely incorporated herein. I/O traffic regulator number 1, 55 regulates the traffic flow through input/output control unit number 1, 19. I/O traffic regulator number N, 53 regulates the traffic flow through input/output control unit number N, 21.

Referring now to FIG. 3 for a more specific illustration of the cooperation between an I/O control unit and an I/O traffic regulator, the system modules 60 are 11 is shown in communicative relationship with an I/O control unit 19 by way of trunk line 23, I/O control number 1, 19 being regulated by I/O traffic regulator number 1, 55. The I/O control unit, 19 is shown as having a timing and control decoder logic circuit 59 which is supplied with information over the trunk 23 from system modules 60 which may be either a processor module or a memory module. The timing and control decoder logic 59 has a plurality of outputs 63 going to other sections of the I/O contol unit and an interrogate for I/O path (IIOP) output 65. The interrogate for I/O path signal is supplied to AND logic 61 where it is logically combined with timing signals, other conditions signals, as described in the background of the invention, and a threshold greater or equal to traffic signal (TGET), on line 67. Upon all conditions being present, AND logic circuit 61 produces a path-is-available signal that is sent to a processor module over trunk 23. Referring now to the patent (U.S. Pat. NO. 3,408,632) incorporated by reference which illustrates an input-/output control that may be used for I/O control units 1, 19 (FIG. 3) of this application, specific reference is made to FIG. 5 of the patent. The structure of the timing and control decoder logic 59 (FIG. 3) of this application can take the form illustrated in FIG. 5 of the patent to E. A. Hauck (U.S. Pat. No. 3,408,632). The logic would consist of the initiate counter 70 and the AND gates 119, 74, 99, and 107 shown in FIG. 5. The "initial level from processor line" going to AND gate 74 is one of the lines in trunk 23. Another line in the trunk 23 is the "MANL" line which goes to a memory module 15 (FIG. 1) and initiates a memory cycle when it is high. This is the output line from AND logic 61 (FIG. 3) directed into the cable 23. The other outputs 63 of the decoder logic 59 are timing count signals, as shown in FIG. 5 of the patent. The interrogate for I/O path (IIOP) signal on line 65 from the decoder logic 59 is the IC = 1 signal from the initiate counter 70, shown in FIG. 5 of the patent.

The AND logic 61 (FIG. 3) of this application can take the form illustrated in FIG. 5 of the patent (U.S. Pat. No. 3,408,632). The logic would consist of all the AND gates connected to the three flip-flops 82, 94, and 80. The IIOP signal from the decoder logic 59 would therefore be supplied to AND gate 83, shown in FIG. 5 as IC = 1. The threshold greater or equal to traffic signal (TGET) on line 67 (FIG. 3) would also be an input to this AND gate 83. The other condition lines going into the AND logic 61 of FIG. 3 is a general indication of the other control and condition lines going to the various AND gates connected to the memory access needed flip-flop 82. The function of the signals on these other condition lines are fully set forth in the patent. It is sufficient for the purposes of this invention to realize that the memory access needed flipflop 82 is set thereby requesting a memory cycle if the three inputs To, IC = 1, and AGL-IC to AND gate 83 (FIG. 5 of the patent) and the additional input TGET on line 67 (FIG. 3) of this application are all high.

During a certain I/O operation, leads 69 from the I/O control unit 19 to the I/O traffic regulator 55 carry peripheral identification information from the control designator decoder matrix 104 (FIG. 3A of U.S. Pat. No. 3,408,632) to the I/O traffic regulator. Lead 71 of the I/O control unit carries an I/O start signal, the output of AND gates 119 (FIG. 5 of the U.S. Pat. NO. 3,408,632) to the I/O traffic regulator 55. This start signal is generated as a result of the last of the initiate states occurring in the I/O control unit. Line 73 carries an I/O end signal, the output of AND gate 180 (FIG. 6B of the U.S. Pat. No. 3,408,632) from the I/O control to the I/O traffic regulator 55.

Each I/O traffic regulator, such as traffic regulator number 1, 55 connected to its respective I/O control 19 consists of a threshold register 77, combinatorial logic 75, traffic counter 83 and comparison logic 85. The threshold register 77 is a standard-in-the art binary bit register that may be N number of bits long. The length of the register is determined by the size of the binary number needed to be stored, this binary number defining the maximum total I/O traffic rate which may be performed by the particular I/O control unit to which the I/O regulator 55 is attached. The binary number that represents the maximum total I/O traffic rate to be performed by a particular I/O control can be loaded into the threshold register by a processor 11 functioning under the direction of the operating system of the data processing system. Alternatively, the threshold register 77 may be loaded directly by manually setting a binary number into it. Once a binary number which represents the maximum total I/O traffic rate of the particular I/O control is set into the threshold register, this binary number will be continually supplied to the comparison logic circuit 85 without changing or destroying the binary number stored in the threshold register 77. Only by loading a new binary number into threshold register 77 can the contents thereof be changed. For purposes of example, it shall be assumed that threshold register 77 is a four bit register.

Comparison logic circuit 85 compares the binary number received from the threshold register 77 and the binary number received from a traffic counter 83. The comparison logic circuit 85 functions to compare the relative sizes of the two received numbers, generating a TGET signal whenever the number received from the traffic counter 83 is greater or equal to the number received from the threshold register 77 If the relative size of the number received from the traffic counter 83 is less than the number received from the threshold register 77, comparison logic circuit 85 does not generate a TGET signal on line 67 thereby causing AND logic circuit 61 in the I/O control unit 19 to present a a memory access neded signal to the system module 60. Naturally, whenever a TGET signal is generated by a comparison logic circuit 85, the AND logic circuit 61 in the I/O control unit is triggered to inform the system that no memory access is desired, thereby preventing the I/O control unit 19 from accepting a new I/O operation. Structurally, assuming that the threshold register 77 is a four bit binary register, the comparison logic 85 could be a comparator chip manufactured by the Fairchild Corporation and disclosed in their June 1972 semiconductor data book, page 8–124. The four bit output of the threshold register 77 would be loaded into a first set of four (A) parallel inputs of the comparator chip. The output of the traffic counter 83, assuming it is a four bit binary up/down counter, would be loaded into a second set (B) of four parallel inputs on the comparator chip. The enable input of the chip is active when low. So, no logic level driver or timing is required for the comparator chip if it is going to be comparing all the time, as in this invention. The Fairchild 9324 five Bit comparator chip has three outputs A > B, A < B, and A = B. The TGET output signal on line 67 would be the NOR combination of the two outputs of the five bit comparator, A < B and A = B. Thus, whenever the number is the threshold register A is smaller or equal to the output of the traffic counter B the TGET signal on line 67 would be low, inhibiting AND gate 83 (FIG. 5 of the Hauck U.S. Pat. No. 3,408,632).

The traffic counter 83 is a standard-in-the-art up-down binary counter having an up count input 79 and a down count input 81. The traffic counter responds to these inputs by counting up or down the appropriate number dictated by the signals on the respective input lines. A four bit binary up/down counter that could be used for the traffic counter 83 of this invention is the Signetics S54193 or H74193 synchronous four-bit binary up/down counter illustrated on page 167 of their TTC logic catalog of 1971. The four bit parallel binary outputs would be supplied to the B set of parallel inputs on the comparator chip 85. The up count signals on line 79 from the combinatorial logic 75 are supplied to the up count (clock) input of the binary counter 83. The down count signals on line 81 from combinatorial logic 75 are supplied to the down count (clock) input of the binary counter 83.

The count instructions that originate from combinatorial logic 75 are the result of information sent to the combinatorial logic circuit 75 from the I/O control unit 19. The combinatorial logic circuit 75 uses this information which consists of: type of peripheral information, sent on lines 69, an I/O begin signal, sent over line 71, and an I/O end signal, sent over line 73.

Whenever an I/O begin signal is received by the combinatorial logic circuit 75 a binary up count signal is generated and presented to the traffic counter 83 over line 79. The size of this binary up count signal is determined by the type of peripheral information, received by the combinatorial logic. For example, the binary up count signal for a disk like peripheral unit may be twice as large as the binary up count signal for a magnetic tape peripheral unit. The reason for this deviation, as was explained above, is the variation in the data transfer rates between the disk file peripheral unit and the magnetic tape peripheral unit. Thus, the binary up count signal being generated by combinatorial logic 75 is weighted, weighted according to the type of peripheral that will be involved in the I/O operation. The binary down count signal is also weighted, according to the type of peripheral unit that is stopping an I/O transfer operation. The combinatorial logic circuit 75 consists of well-known logic circuit elements combined to produce the appropriate binary up-count signals and down-count signals for the traffic counter 83, the specific logic used not being critical. Assuming, for purposes of example, that only disk-file and tape-drive peripherals are connected to the number 1 I/O control unit 19, as noted above, the binary up-count and down-count signal would have to be twice as large for the disk-file as the tape drive. Thus, whenever a disk-file is requesting access or terminating its operation, an up-count of two or a down-count of two, respectively, would be generated by the combinatorial logic 75. Likewise, whenever a tape-drive is requesting access or terminating its operation, an up-count of one or a down-count of one, respectively, would be generated by the combinatorial logic 75. The exact binary count generated by the logic circuit 75 for each peripheral is a matter of design choice. However, the relative magnitudes of the counts between different peripherals must reflect their relative speeds. The operation of the combinatorial logic circuit 75 for the example of a disk-file and tape-drive peripheral may be more concisely expressed by the following boolean equations:

| | |
|---|---|
| Disk · I/O start | = count up 2 |
| Tape · I/O start | = count up 1 |
| Disk · I/O end | = count down 2 |
| Tape · I/O end | = count down 1 |

The general form of these equations describe the operation of the logic circuit 75 no matter how many peripherals are connected to the I/O control unit or what the weighted pulse count for each is chosen to be.

For the specific example of two peripherals, one being a disk-file, the other a tape-drive, the combinatorial logic 75 would respond to the signals on lines 69, 71 and 73 in the following manner. The combination of a high on the disk-file line in the group of lines 69 from the decode matrix 104 (FIG. 3A of U.S. Pat. No. 3,408,632) plus a high on the I/O start line 71 will cause the combinatorial logic to place two pulses in succession on line 79, thereby causing the traffic counter to count up two bits. The combination of a high on a tape-drive line in the group of lines 69 plus a high on the I/O start line 71 will cause the combinatorial logic 75 to place one pulse on line 79, thereby causing the traffic counter to count up by one bit. The combination of a high on a disk-file line in the group of lines 69 plus a high on the I/O end line 73 will cause the combinatorial logic 75 to place two pulses in succession on the count-down line 81, thereby causing the traffic counter to count down by two bits. The combination of a high on a tape-drive line in the group of lines 69 plus a high on the I/O end line 73 will cause the combinatorial logic 75 to place one pulse on the count-down line 81, thereby causing the traffic counter to count down one bit.

As a result of the operation of combinatorial logic 75 and traffic counter 83, traffic counter 83 always has an updated binary number stored therein that is representative of the total instantaneous traffic rate through the particular I/O control unit 19 to which it is connected.

By attaching the above-described I/O traffic regulator to each I/O control in a modular data processing system, as shown in FIG. 2, the traffic rate of the entire system may be controlled simply by controlling the traffic rate of each I/O control. As explained earlier, the traffic rate of each I/O control unit is determined by the binary number loaded into the threshold register 77 in each I/O traffic regulator. In the case of a data processing system having a plurality of I/O control units wherein several I/O control units are very busy and the others are relatively idle, it is desirable to allocate the I/O traffic more efficiently among the various I/O control units in the data processing system. This can be accomplished by staggering the size of the binary number in the threshold registers of the respective I/O traffic regulators, to counterbalance the varying degree of busyness system effect. In other words, the more busy I/O control units would have a lower threshold number than would the less busy I/O control units, thereby causing the previously more busy I/O control units to refuse to initiate additional I/O operations at a traffic rate that would be lower, relative to the traffic rate at which the previuosly inactive I/O control unit would refuse to initiate additional I/O operations.

In summary, it can be seen that our invention prevents the occurrence of excessive access errors due to the number of concurrent I/O operations being performed by a particular input/output control unit and provides a means for selectively distributing all the system I/O operations between the several input/out control units of a processing system and accomplishes the above-cited functions in an inexpensive manner. Obviously, many modifications and variations of the present invention are possible in light of the above teachings. It is therefore, to be understood that within the scope of the appended claims the invention may be practiced otherwise than as specifically described.

What is claimed is:

1. In a data processing system, wherein communication between a plurality of peripheral devices and the central processing system is controlled by a plurality of input/output control multiplexers, some of said peripheral devices being connected to more than one of said input/output control multiplexers, a separate traffic regulator connected to each of said input/output control multiplexers for regulating the flow of data between said system and said peripheral devices through said input/output control multiplexers, said traffic regulator comprising:

means, receiving an I/O begin signal, an I/O end signal, and a type of peripheral signal from the input/output control multiplexer said traffic regulator is connected to, for generating an up-count signal or a down-count signal;

means responsive to said up-count and down-count signals for generating a traffic variable represented by a binary number that is the instantaneous sum of the binary number within said up count, down-count responsive means and the binary number indicated by said up-count signal and down-count signal;

means for receiving and storing a threshold variable represented by a binary number; and means for continuously comparing said traffic variable binary number and said threshold variable binary number and generating a binary signal whenever said traffic variable binary number is equal to or greater than said threshold variable binary number, whereby on indication is given to said input/output control multiplexer that a data transfer operation may not be initiated at this time.

2. The traffic regulator of claim 1 wherein said up-count, down-count signal generating means generates an upcount signal whenever an I/O begin signal is received, the magnitude of said up-count signal depending on the type of peripheral signal received with said I/O begin signal.

3. The traffic regulator of claim 1 wherein said up-count, down-count signal generating means generates a down-count signal whenever an I/O end signal is received, the magnitude of said down-count signal depending on the type of peripheral signal received with said I/O end signal.

4. In a data processing system, wherein communication between a plurality of peripheral devices and a central processing system is controlled by a plurality of input/output control multiplexers, a method of regulating the flow of data between said system and said peripheral devices through said input/output control multiplexers by utilizing combinatorial logic operating in combination with traffic counter apparatus and comparison logic, said method comprising:

generating a binary up-count or down-count signal in response to receiving an I/O begin signal, an I/O end signal, and a type of peripheral signal from one of said input/output control multiplexers;

generating a traffic variable that is the instantaneous sum of previously generated binary up-count signals that are the result of presently active data transfer operations and the binary number indicated by said up-count and down-count signal;

determining a threshold variable binary signal indicative of a desired ceiling on said data transfer operation;

continuously comparing said traffic variable binary signal and said threshold variable binary signal; and generating a binary signal for inhibiting the institution of further data transfer operations between said system and a peripheral device, through a particular input/output control multiplexer, whenever said traffic variable signal becomes equal to or greater than said threshold variable signal.

5. In a data processing system, wherein communication between a plurality of peripheral devices and a central processing system is controlled by a plurality of input/output control multiplexers, some of said peripheral devices being connected to more than one of said input/output control multiplexers, a method of distributing the data transfer operations between said plurality of input/output control multiplexers by utilizing combinatorial logic operating in combination with traffic counter apparatus and comparison logic, said method comprising:

for a first input/output control multiplexer, generating a binary up-count signal or a binary down-count signal in response to receiving an I/O begin signal, an I/O end signal and a type of peripheral signal from said first input/output control multiplexer;

generating a traffic variable that is the instantaneous sum of previously generated binary up-count signals that are the result of presently on-going data transfer operations and the binary number indicated by said up-count and down-count signal;

determining a threshold variable binary signal indicative of a desired ceiling on said data transfer operations for said input/output control multiplexer;

continuously comparing said traffic variable binary signal and said threshold variable binary signal;

generating a binary signal for inhibiting the institution of further data transfer operations between said system and a peripheral device, through said input/output control multiplexer, whenever said traffic variable signal becomes equal to or greater than said threshold variable signal; and simultaneously carrying out the above steps for each input/output control multiplexer in said data processing system.

* * * * *